No. 12,771. REISSUED MAR. 31, 1908.

M. E. DRIPPS.

EYEGLASS HOLDER.

APPLICATION FILED NOV. 14, 1907.

WITNESSES

Samuel E. Wade

J. Middleton

INVENTOR

MARY E. DRIPPS.

BY Munn & Co.

ATTORNEYS

THE NORRIS PETERS CO., WASHINGTON, D. C.

UNITED STATES PATENT OFFICE.

MARY E. DRIPPS, OF WASHINGTON, DISTRICT OF COLUMBIA.

EYEGLASS-HOLDER.

No. 12,771. Specification of Reissued Letters Patent. Reissued Mar. 31, 1908.

Original No. 852,599, dated May 7, 1907, Serial No. 349,679. Application for reissue filed November 14, 1907. Serial No. 402,223.

*To all whom it may concern:*

Be it known that I, MARY E. DRIPPS, a citizen of the United States, residing at Washington, in the District of Columbia, have invented certain new and useful Improvements in Eyeglass-Holders, of which the following is a specification.

My invention is an improvement in the class of eyeglass holders in which a body part or base is adapted for attachment to the clothing and provided with a hook for suspending the eyeglasses when not in use.

The invention is embodied in the form or construction of the hook attachment and its arrangement relative to the body or base to which it is secured.

Figure 1:
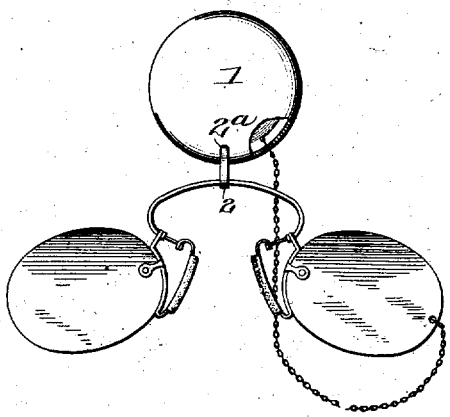
Figure 4:
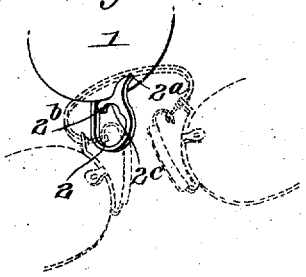
Figure 5:
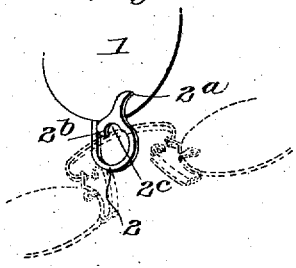
Figure 2:
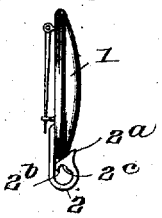
Figure 3:
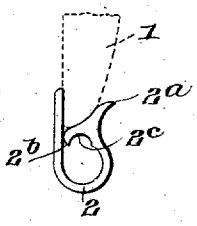

The details of construction, arrangement, and operation of parts are as hereinafter described, and shown in the accompanying drawings in which Figure 1 is a face view showing my hook attachment and eyeglasses suspended therefrom. Fig. 2 is a side or edge view of the hook attached to the body part which is adapted to be secured to clothing. Fig. 3 is an enlarged view of the hook attachment proper. Figs. 4 and 5 are views illustrating the position or angle of the eyeglasses when being attached to and detached from the hook.

In carrying out my invention I employ in connection with the casing 1, such as used in the type of eye-glass suspending contrivances above noted, a spring-metal hook 2 having one end brazed or soldered to the back of said casing near its bottom edge. Said hook has its lower central portion formed into a loop, and its forward part just at the upper forward terminal of the loop abuts or presses against the front bottom edge of said casing, said hook being then deflected outward and upward a short distance away from the front or face of said casing to permit the ready engagement therewith of the spring of an eyeglass frame. The spring being thus passed into the loop, it then serves to support the eyeglass out of the way when not required for use. In place of the eyeglass being left dangling from the case as would otherwise be the fact, said hook is provided below the point of engagement with the face 1, with the tapered projection $2^b$ which curves downwardly and rearwardly but in such manner or position that it prevents upward displacement of the eyeglass as would be likely the case by the accidental forcing of the eyeglass spring edgewise upward. The upper end of the head of the T-shaped hook $2^a$ is tapered and curved outwardly or away from the face of the casing 1. This curve obviously enables the spring of an eyeglass to be passed into the spring loop 2 more readily than would be otherwise practicable.

It will be observed that the T head is undercut at $2^c$, said part being curved or formed practically on an arc of the circle nearly corresponding with the general circular form of the loop 2. This curve gives a conformation that aids in preventing the eyeglass spring slipping readily upward and out of the loop, accidentally.

The dotted lines, Figs. 4 and 5, illustrate, respectively, the position in which an eyeglass is held for the purpose of engaging it with, and disengaging it from, the spring hook.

The hook suspending device is thus adapted to hold an eyeglass with security and safety, yet readily accessible and detachable for use whether the chain connected therewith be taken up into the casing by the spring therein, or left hanging free from the casing or other device attached to the clothing.

What I claim is:

1. An eye-glass holder, comprising a body part adapted to be attached to the clothing a spring hook for supporting the eyeglass and attached to said body part the same having an irregular T-shape head arranged at an angle to the plane of the body part, the upper end of the head being tapered and turned outward and the inner end tapered and turned downward and outward from the shank of the hook, and the central portion of the head being in contact with a convexity at the lower portion of the casing, as shown and described.

2. An eye-glass holder, comprising a body part adapted to be attached to the clothing, a spring hook secured to said body part for supporting eye-glasses, the same consisting of a pendent shank which is attached to the body part, and its extended lower portion curved to form a loop whose free terminal is T-shaped and has the head of the T arranged at an angle to the shank and in contact with the lower portion of the body part, as shown and described.

3. An eye-glass holder comprising a body part adapted for attachment to the clothing, a spring hook secured to said body part and extended downward and then upward in a curve forming a loop 2, and its free end having an irregular T-shape and located just below the body part and arranged at an inclination to the latter and the shank of the hook, the ends of the head being tapered and turned outward and downward respectively, and the under side of the lower portion being undercut, as shown and described.

MARY E. DRIPPS.

Witnesses:
SOLON C. KEMON,
AMOS W. HART.